United States Patent
Nishimoto et al.

(12)
(10) Patent No.: US 6,759,950 B2
(45) Date of Patent: Jul. 6, 2004

(54) ULTRASONIC OBSTACLE DETECTOR AND METHOD OF ASSEMBLING THE SAME

(75) Inventors: Yukio Nishimoto, Tokyo (JP); Akiharu Fukuda, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 43 days.

(21) Appl. No.: 10/013,467

(22) Filed: Dec. 13, 2001

(65) Prior Publication Data

US 2002/0190850 A1 Dec. 19, 2002

(30) Foreign Application Priority Data

Jun. 19, 2001 (JP) .......................................... 2001-185101

(51) Int. Cl.[7] .............................................. B60Q 1/00
(52) U.S. Cl. ...................... 340/436; 340/435; 340/693; 340/904; 340/554; 280/735; 180/274
(58) Field of Search ................................ 340/436, 435, 340/693; 180/274; 280/735; 200/61.58 R; 360/904, 665, 581, 567, 566, 943, 552–557; 361/730, 600

(56) References Cited

U.S. PATENT DOCUMENTS

| | | | | |
|---|---|---|---|---|
| 3,750,100 A | * | 7/1973 | Ueda ............................ | 340/436 |
| 5,745,050 A | * | 4/1998 | Nakagawa .................... | 340/903 |
| 5,844,471 A | * | 12/1998 | Daniel ......................... | 340/436 |
| 6,089,106 A | * | 7/2000 | Patel et al. ............ | 73/862.582 |
| 6,431,594 B1 | * | 8/2002 | Swann et al. ................ | 380/735 |
| 6,457,545 B1 | * | 10/2002 | Michaud et al. ............ | 180/272 |
| 6,483,420 B1 | * | 11/2002 | Takahashi et al. .......... | 337/410 |
| 6,520,538 B2 | * | 2/2003 | Katsuda et al. .............. | 280/741 |

FOREIGN PATENT DOCUMENTS

JP        61-125784        8/1987

* cited by examiner

*Primary Examiner*—Julie Lieu
(74) *Attorney, Agent, or Firm*—Sughrue Mion, PLLC

(57) ABSTRACT

A cap is fit to a sensor case having a sensor-mounting hollow portion integrally formed therewith into which an ultrasonic sensor is fit. A plate spring is fit onto an outside of the sensor case to engage the plate spring with the cap. This plate spring integrally holds together both the sensor case and the cap. Having been constructed as above, the invention provides an easy integral assembly of a sensor case and a cap by means of a single plate spring and exhibits the ability for mounting and fixing the detector to a bumper or the like of a vehicle.

21 Claims, 12 Drawing Sheets

ULTRASONIC OBSTACLE DETECTOR AND METHOD OF ASSEMBLING THE SAME

BACKGROUND OF THE INVENTION

1. Field of the Invention

This invention relates to an ultrasonic obstacle detector mounted on a bumper or the like of a vehicle such as an automotive vehicle, as well as to a method of assembling the same.

2. Description of the Prior Art

FIG. 16 is a side view showing a conventional ultrasonic obstacle detector. FIG. 17 is a front view of FIG. 16. FIG. 18 is a sectional view taken along the line A—A in FIG. 17. FIG. 19 is a rear end view of FIG. 16. FIG. 20 is an exploded side view of FIG. 16 and FIG. 21 is a plan view of FIG. 20 with the case cover opened.

In these figures, reference numeral 1 denotes a sensor case. A case cover 2 for this sensor case 1 is connected along one edge of an open end of the sensor case 1. Engaging claws 3 are integrally formed on an outer wall of the sensor case 1 along the opposite edge of the open end of the sensor case 1. Engaging holes 4 are provided on a free end of the case cover 2 so as to engage with the engaging claws 3. An ultrasonic sensor 5 is partly fit in its periphery into a front end (right in FIG. 18) of the sensor case 2 through a sensor holder 6. This ultrasonic sensor 5 is held between the case cover 2 and the sensor case 1 by pinching them when the case cover 2 is closed.

In FIGS. 18 and 21, a circuit board 7 is contained inside the sensor case 1 with being electrically connected to the ultrasonic sensor 5. A connector lead wire 8 connected to the circuit board 7 is led outside the sensor case 1. As shown in FIG. 16, at a lead-out end of this connector lead wire 8, a connector 9 for external connection is connected. Reference numeral 10 denotes a cap fit in and engaged with a front end of the sensor case 1 with the case cover 2 closed. This cap 10 is to hold the ultrasonic sensor 5 by covering the periphery of the front end of the sensor holder 6, and has integrally formed an outward flange 10a on its front end.

Reference numeral 11 denotes a plate spring which is assembled into the sensor case 1. This plate spring 11 is made up of: a bottom plate 11b having mounting holes 11a (see FIG. 19) which are press-fit into protrusions 1a provided on a rear end surface of the sensor case 1; and arm pieces 11c (four in the figures) which extend from this bottom plate 11b to the vicinity of the outward flange 10a of the cap 10 along the outer wall of the sensor case 1 and the case cover 2. On a front end of the arm pieces 11c articulated portions 11d are provided, which pinches a hole edge portion of a sensor-mounting hole (not shown) formed in a bumper of a vehicle, between the outward flange 10a and the articulated portions 11d. An intermediate portion of each of the arm pieces 11c is engaged with the outer wall portions of the sensor case 1 and the case cover 2, respectively. The portions to be engaged are denoted by reference numerals 11e.

A description will now be given of the assembly of this detector.

First, the case cover 2 is opened to fit the sensor holder 6, fit-in by the ultrasonic sensor 5, into the front end of the sensor case 1. The circuit board 7 which is electrically connected to the ultrasonic sensor 5 by a connector lead wire 8 is mounted inside the sensor case 1 in the direction perpendicular to the axial direction of the ultrasonic sensor 5. The case cover 2 is then closed with the connector lead wire 8 connected to the circuit board 7 which us led outside, and the engaging holes 4 formed in the case cover 2 are engaged with the engaging claws 3 on the sensor case 1. The ultrasonic sensor 5 is thus pinched by the sensor case 1 and the case cover 2 through the sensor holder 6.

Then, the cap 10 is press-fit into the front end of the sensor case 1 inclusive of the case cover 2 through the peripheral portion of the sensor holder 6. The ultrasonic sensor 5 is thus held by the cap 10. Thereafter, the protrusions 1a on the rear end of the sensor case 1 are press-fit into the mounting holes 11a of the bottom plate 11b. Also, the intermediate portion 11e of each of the arm pieces 11c of the plate springs 11 is engaged with the outer walls of the sensor case 1 and the case cover 2, respectively.

After the ultrasonic obstacle detector has been assembled as described above, a molding resin is filled from a molding opening 2a (see FIG. 21) formed in the case cover 2. The ultrasonic obstacle detector is ultimately completed. When this detector is to be mounted on a bumper of a vehicle, the sensor case 1 inclusive of the case cover 2 is inserted into a sensor-mounting hole formed in the bumper of the vehicle from the rear end of the detector, together with the connector lead wire 8. At the time of inserting the detector, the articulated portions 11d of the arm pieces 11c are elastically deformed inwardly at the hole edge portion of the sensor-mounting hole. When the outward flange 10a of the cap 10 comes into contact with a front surface of the bumper and the articulated portions 11d passed through the sensor-mounting hole, the articulated portions 11d are elastically restored to their original state. As a result, the hole edge portion of the sensor-mounting hole formed in the bumper is pinched between the articulated portions 11d and the outward flange 10a. The ultrasonic obstacle detector can ultimately be mounted on the bumper of the vehicle.

However, there have been a drawback that the number of working steps increases undesirably, and the assembly of the ultrasonic sensor 5 and the cap 10 is troublesome, resulting in a poor working efficiency since the conventional ultrasonic obstacle detector has been constructed as described above. Namely, in order for the ultrasonic sensor 5 to be assembled into the sensor case 1, after the sensor holder 6 into which the ultrasonic sensor 5 is fit into the inside of the front end of the sensor case 1 with the case cover 2 opened, and the engaging claws 3 of the sensor case 1 must be engaged with the engaging holes 4 in the case cover 2 with the case cover 2 closed. In addition, the cap 10 which is used only for the purpose of bringing itself into contact with the front surface of the bumper should be press-fit into the outer walls of the sensor case 1 and the case cover 2, respectively, while sliding along the peripheral edge portion of the sensor holder 6 from the front side thereof.

Furthermore, there has been a drawback that the assembly of the plate spring 11 is time-consuming, resulting in a poor work efficiency since the plate spring 11 has only the ability for mounting the ultrasonic obstacle detector on the bumper of the vehicle. In addition, in assembling the plate spring 11 into the sensor case 1, the mounting holes 11a in the base plate 11b must be press-fit through the protrusion 1a on the rear end of the sensor case 1 along the axial direction. The intermediate engaging portion 11e of each of the arm pieces 11c must further be engaged with the outer walls of the sensor case 1 and the case cover 2, respectively. Still furthermore, the sensor holder 6, the circuit board 7, the cap 10 and the plate spring 11 are assembled one another from the different directions relative to the sensor case 1. In this point, too, much manpower is required for assembling these parts together, resulting in a poor work efficiency.

SUMMARY OF THE INVENTION

This invention has been made to solve the above drawbacks, and an object thereof is to provide an ultrasonic obstacle detector which provides an easy integral assembly of a sensor case and a cap by means of a single plate spring, and which exhibits the ability for mounting and fixing the detector to the bumper or the like of a vehicle.

Another object of the invention is to provide an ultrasonic obstacle detector which simplifies the shape of the plate spring, and which easily assembles the plate spring onto the sensor case and the cap.

Still another object of the invention is to provide an ultrasonic obstacle detector which stably and firmly assembles the plate spring relative to the sensor case and the cap.

Still another object of the invention is to provide an ultrasonic obstacle detector which enables easy and sure positioning into the fitting position of the sensor case.

Still another object of the invention is to provide an ultrasonic obstacle detector which enables easy filling of the molding resin into the space formed between the sensor case and the cap.

Still another object of the invention is to provide an ultrasonic obstacle detector which eliminates a connector for external connection with a connector lead wire as a separate part to improve the workability and to reduce the cost.

Still another object of the invention is to provide an ultrasonic obstacle detector which is mountable even on a vehicle with a sensor-mounting portion like a bumper or the like having only a limited depth.

Yet still another object of the invention is to provide an ultrasonic obstacle detector which offers secure water proofness of the connector-inserting portion without requiring a separate part such as a sealing rubber or the like, and which reduces the cost of the materials.

Yet still another object of the invention is to provide an ultrasonic obstacle detector which maintains the strength at the connector-inserting portion.

Yet still another object of the invention is to provide an ultrasonic obstacle detector which is less subject to the influence of heat generated in soldering the connector terminals to the circuit board, and which prevents heat generated in a soldering from being transmitted.

Yet still another object of the invention is to provide an ultrasonic obstacle detector which is less subject to the influence of heat generated in soldering the connector terminals to the circuit board.

Yet still another object of the invention in to provide a method of assembling an ultrasonic obstacle detector which assembles the parts of the detector in one direction to improve the workability.

In order to achieve the above objects, an ultrasonic obstacle detector according to the invention comprises: a sensor case having in a front portion thereof an integrally formed sensor-mounting hollow portion with an outwardly faced flange, an ultrasonic sensor being fit into the sensor mounting hollow; a circuit board contained inside the sensor case and electrically connected to the ultrasonic sensor; a cap fit into an opening of the sensor case; and a plate spring fit onto an outside of the sensor case for engaging with the cap to integrally hold together both the sensor case and the cap, the plate spring having an integrally formed elastic engaging member for pinching a peripheral wall of a sensor-mounting hole between the flange and the elastic engaging member.

The plate spring according to the invention comprises: a substantially U-shaped spring body portion having on each lateral side thereof a leg piece portion which is fit onto an outside of the sensor case; an engaging means hole formed inside of the leg piece portion; an arm-shaped elastic engaging member extending forward from the leg piece portion and elastically deformable in the relative direction each other; and an articulated portion formed in an articulated manner on each front end of the arm-shaped portion so as to pinch the peripheral wall of the sensor-mounting hole of the vehicle between the flange and the articulated portion; the cap having on each outer side wall thereof an engaging claw for engaging into the engaging hole.

The plate spring according to the invention further comprises an intermediate piece portion which extends forward from the spring body portion between both the leg piece portions, and which has an engaging hole formed therein, and the sensor case desirably has an integrally formed engaging protrusion on an outer wall portion thereof for fitting into the engaging hole in the sensor case.

A rugged engaging portion is formed on an open end of the sensor case and a coupling surface of the cap.

A molding resin is filled into an inside space formed between the sensor case and the cap.

An opening is formed in the cap for filling a molding resin therethrough.

A connector formed internally for external connection.

Preferably, the connector is integrally formed with the cap so as to extend relative to the cap in a direction substantially perpendicular to the axial direction of an ultrasonic sensor.

The connector for external connection is arranged such that a connector terminal extends outward beyond the cap.

The connector terminal is plugged into a terminal plug hole formed in the cap such that the connector terminal and the terminal plug hole form a wedge-engagement with each other.

A recessed groove surrounding the terminal plug hole is formed on an inner wall.

A heat shutoff hole is formed near the bottom portion of the connector terminal which is inserted into the circuit board.

A method of assembling an ultrasonic obstacle detector according to the invention comprises: a first step of plugging a connector terminal into a terminal plug hole formed in a cap to be fit into a sensor case; a second step of, after having plugged the terminal, plugging a circuit board through the terminal, soldering, and fitting the sensor case into the cap in a plugging direction of the terminal while containing the circuit board inside the sensor case; and a third step of, after the fitting at the second step, fitting a plate spring onto the sensor case in the plugging direction of the terminal into the cap to engage the plate spring with the cap.

BRIEF DESCRIPTION OF THE DRAWINGS

The above and other objects and the attendant advantages of the present invention will become readily apparent by referring to the following detailed description when considered in conjunction with the accompanying drawings, wherein.

Throughout the figures, the same reference numerals, and characters, unless otherwise noted, are used to denote like features, elements, components, or portions of the illustrated embodiment.

DETAILED DESCRIPTION OF THE PREFERRED EMBODIMENTS

Hereinafter, preferred embodiment of the invention will be described in detail, referring to the attached drawings.

Figure 1:
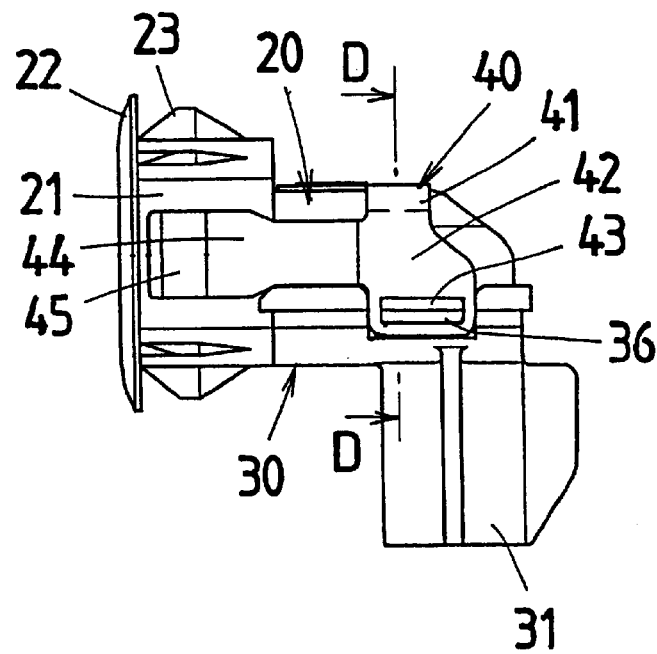
FIG. 1 is a side view of an ultrasonic obstacle detector according to an embodiment of this invention.
Figure 2:
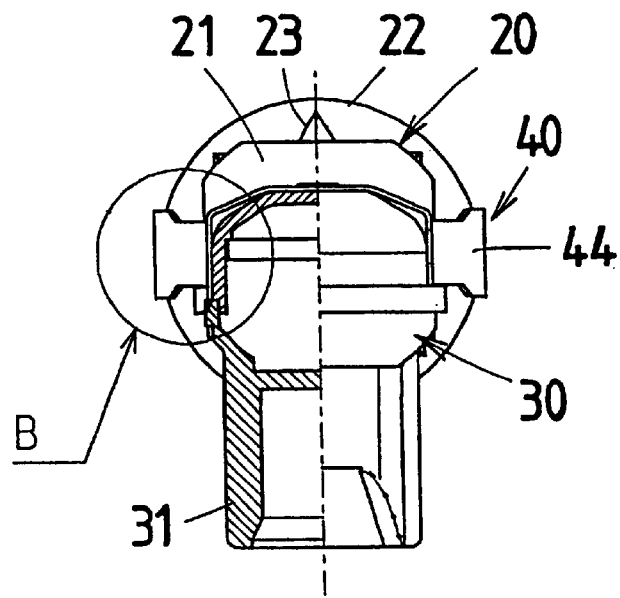
FIG. 2 is a rear view, partly shown in section, of FIG. 1.
Figure 3:
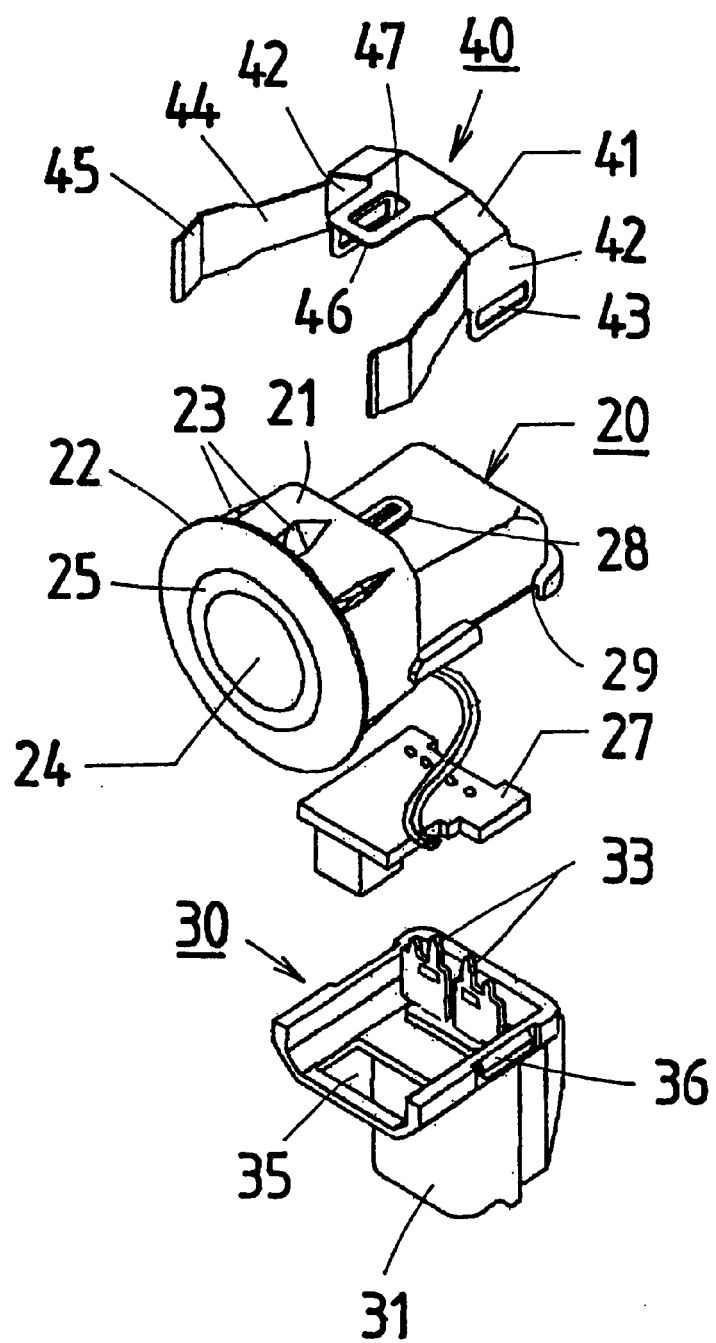
FIG. 3 is an exploded perspective view of FIG. 1.
Figure 4:
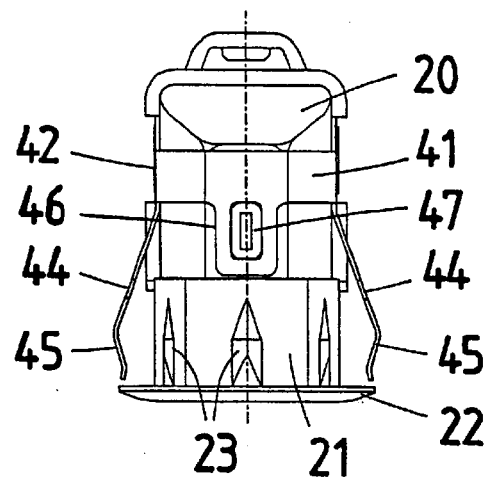
FIG. 4 is a plan view of FIG. 1.
Figure 5:
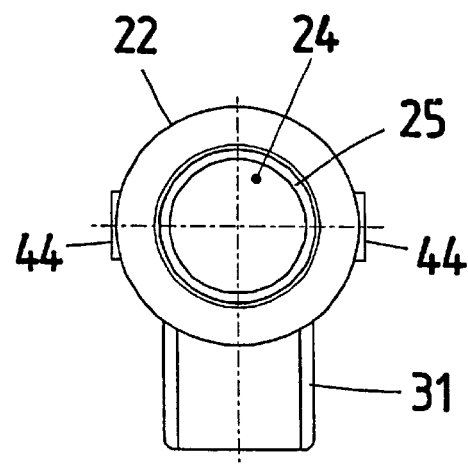
FIG. 5 is a front view of FIG. 4.
Figure 6:
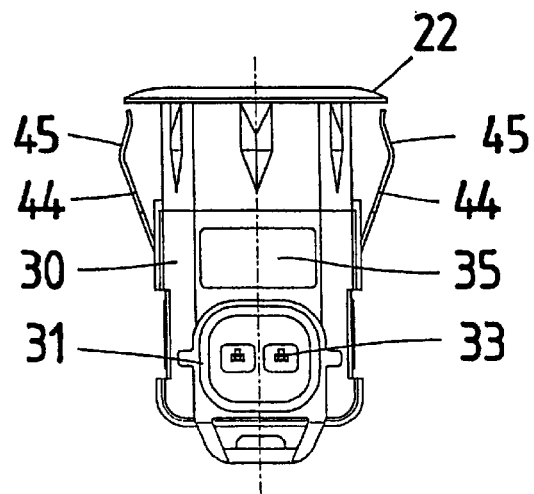
FIG. 6 is a bottom view of FIG. 5.
Figure 7:
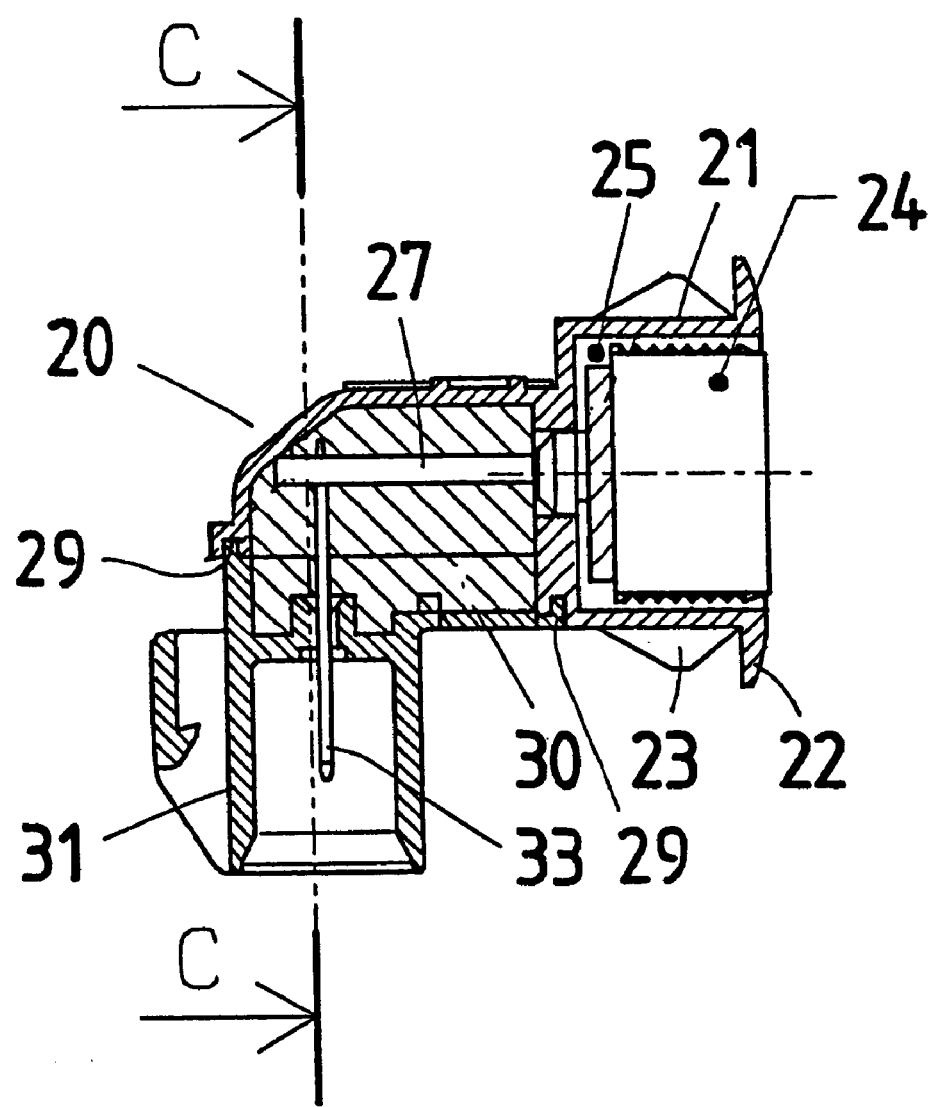
FIG. 7 is a sectional view of the detector in FIG. 1 with the right side and the left side inverted.
Figure 8A:
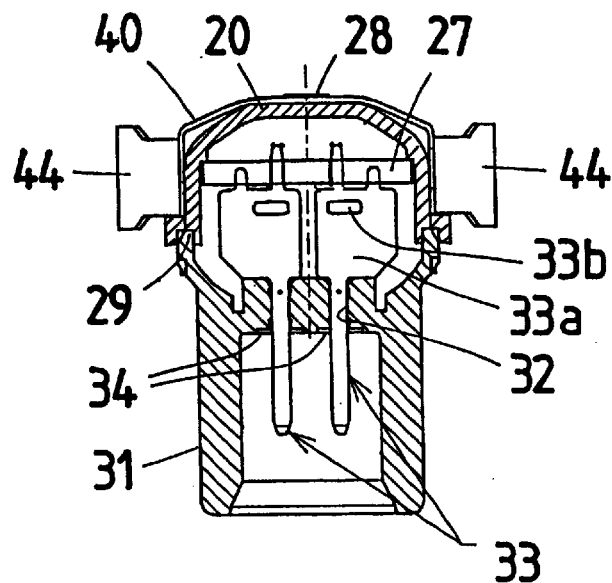
FIG. 8A is a sectional view taken along the line C—C in FIG. 7
Figure 8B:
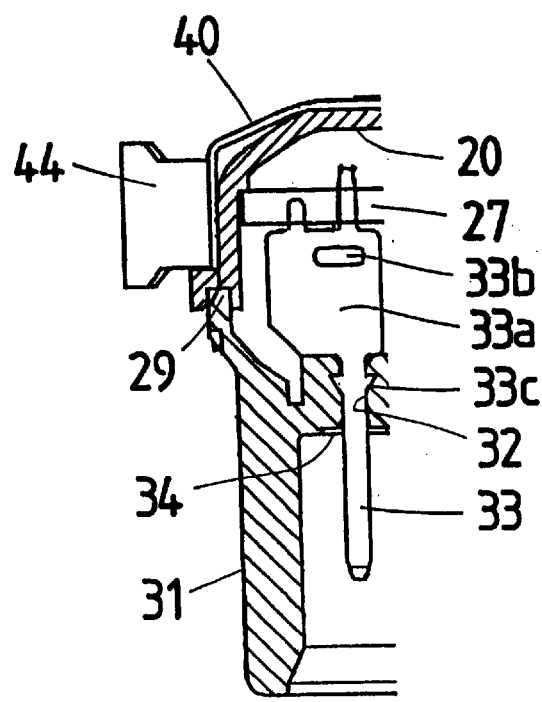
FIG. 8B is an enlarged partial sectional view of FIG. 8A.
Figure 9:
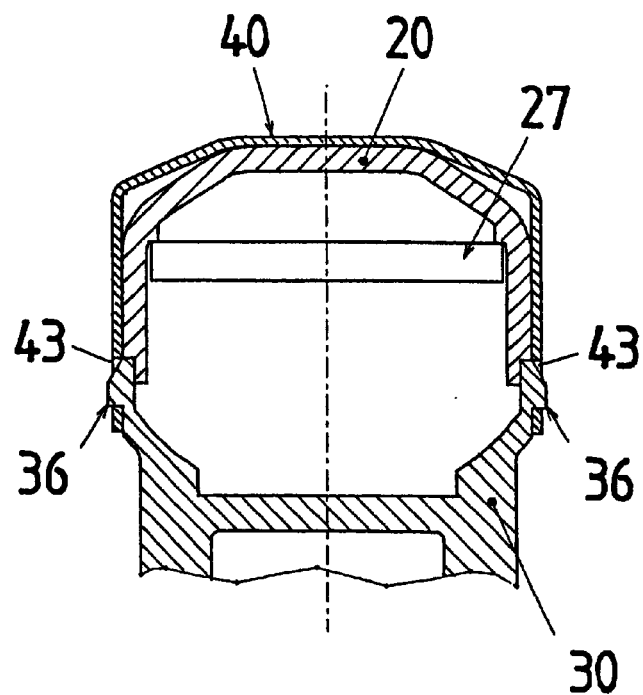
FIG. 9 is an enlarged sectional view taken along the line D—D in FIG. 1.
Figure 10:
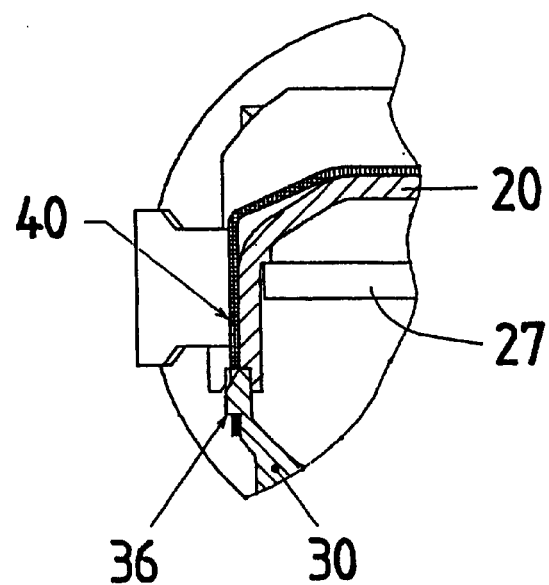
FIG. 10 is an enlarged view of the part encircled as B in FIG. 2.
Figure 11:
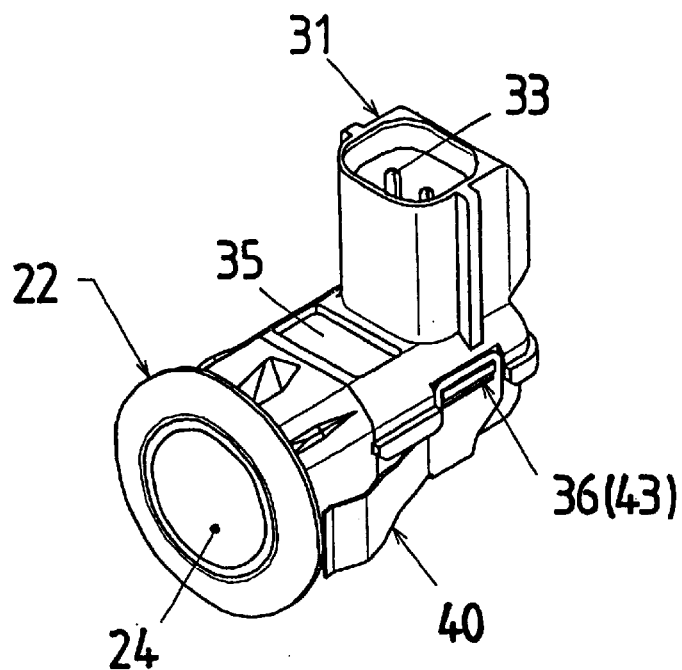
FIG. 11 is a perspective view of the ultrasonic obstacle detector in an assembly before filling a molding resin.
Figure 12:
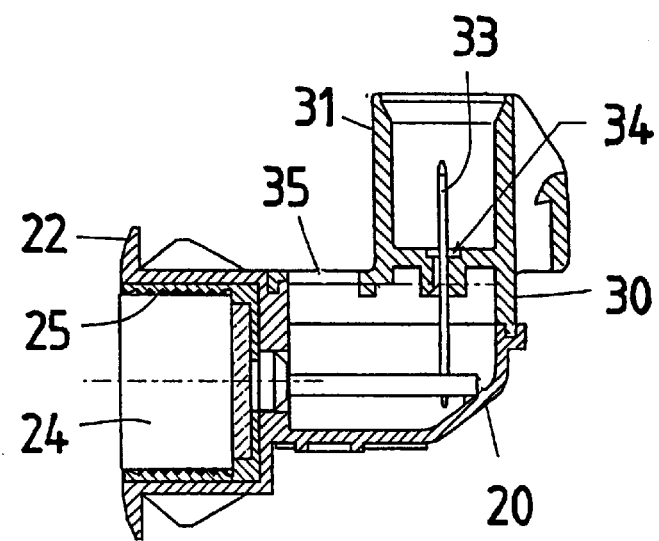
FIG. 12 is a sectional view of FIG. 11.

FIG. 1 is a side view of an ultrasonic obstacle detector according to an embodiment of this invention. FIG. 2 is a rear view, partly shown in section, of FIG. 1. FIG. 3 is an exploded perspective view of FIG. 1. FIG. 4 is a plan view of FIG. 1. FIG. 5 is a front view of FIG. 4. FIG. 6 is a bottom view of FIG. 5. FIG. 7 is a sectional view of the detector in FIG. 1 with the right side and the left side inverted. FIG. 8A is a sectional view taken along the line C—C in FIG. 7 and FIG. 8B is an enlarged partial sectional view of FIG. 8A. FIG. 9 is an enlarged sectional view taken along the line D—D in FIG. 1. FIG. 10 is an enlarged view of the part encircled as B in FIG. 2.

In the figures, a sensor case 20 made of a rigid resin is formed with a substantially U-shape in cross section. At a front end portion (left in FIG. 1) of this sensor case 20, a sensor-mounting hollow portion 21 is integrally formed, forming a sensor-containing recess which is circular in the front view. An outward flange 22 is integrally formed, surrounding a peripheral edge of the sensor-containing recess at the front end of the sensor-mounting hollow portion 21.

A plurality of ribs 23 are formed on a peripheral wall of the sensor-mounting hollow portion 21 at a circumferentially constant interval between the adjoining ribs. An ultrasonic sensor 24 is fit into the sensor-mounting recess in the sensor-mounting hollow portion 21 through a sensor holder 25 (see FIGS. 3 and 7). A lead wire 26 is connected to the ultrasonic sensor 24, and a circuit board 27 is electrically connected to the ultrasonic sensor 24 by the lead wire 26. This circuit board 27 is contained inside the sensor case 20.

In FIGS. 3, 7 and 8, an engaging protrusion 28 for engaging the plate spring 40 is integrally formed near the sensor-mounting hollow portion 21 in the rear wall portion of the sensor case 20. A fitting groove 29 is formed in an open end of the sensor case 20 and is used to fit an edge portion on the open end of a cap 30 into the groove 29.

The cap 30 is fit into the open end portion of the sensor case 20. This cap 30 is formed into a substantially plate (or dish) shape as shown in FIG. 3. By fitting the edge portion into the fitting groove 29 of the sensor case 20, positioning of the fitting position of the cap 30 relative to the sensor case 20 can be attained. A connector 31 for external connection is integrally formed on one side of the cap 30, to extend in a direction perpendicular to the axial direction relative to the cap 30. Therefore, an overall shape of the connector 31 for external connection and the cap 30 is of substantially L-shape as seen from the side.

In FIGS. 8A and 8B, terminal plug holes 32 are formed in a border wall portion between the cap 30 and the connector 31 for external connection. A pair of connector terminals 33 are inserted by plugging them into the terminal plug holes 32. Each of the connector terminals 33 have a broad portion 33a which is formed on that inner side (upper side as seen in FIGS. 8A, 8B) of the connector terminal 33 which lies closer to the circuit board 27, and a heat shutoff hole 33 is formed in the broad portion 33a. As shown in FIG. 8B, a broad portion 33c is integrally formed in that plugging portion of the connector terminal 33 which is inserted into the terminal plug hole 32. It is thus so arranged that the connector terminal 33, once plugged in, will not be able to pull out of position.

A recessed groove 34 is formed around each of the terminal plug holes 32 on an inner surface of the connector 31 for external connection inside the cap 30. This recessed groove 34 serves as a mold pond to hold the molding resin therein and therefore acts as a buffer to prevent the molding resin from reaching the contact portion of the connector terminal 33. An opening 35 is formed in the cap 30 to fill the molding resin therethrough. An engaging claw 36 is integrally formed on each side wall portion of the cap 30 for engaging a plate spring 40 as will be described below.

The plate spring 40 serves to integrally fix the sensor case 20 and the cap 30 together and is made up of: a spring body portion 41 having on each lateral side thereof a leg piece portion 42; an engaging hole 43 which is formed in each of the leg piece portions 42 for engaging with the engaging claw 36 in the cap 30; two arm-shaped elastic engaging pieces 44 extending forward from the respective leg piece portions 42 and deformable in the relative direction each other; an articulated portion 45 which is formed in an articulated manner on an pointed end of the elastic engaging pieces 44; an intermediate piece portion 46 which is provided in an intermediate portion of the spring body portion 41 and extends forward; and an engaging hole 47 which is formed in the intermediate piece portion 46 for engagement with the engaging protrusion 28 of the sensor case 20.

A description will now be given of the assembly of the detector.

First, the connector terminals 33 are plugged into the terminal plug holes 32 in the cap 30 (first step). As a result of this plugging, the wedge-shaped claws 33c of the connector terminals 33 are engaged with the terminal plug holes 32, and thus the connector terminals 33 are firmly fixed in position. Then, the circuit board 27 is fit into position by inserting the connector terminals 33 therethrough and thereafter soldered together. With the circuit board 27 being contained inside the sensor case 20, the sensor case 20 is fit onto the cap 30 in the connector terminals 33 plugging direction (second step). In performing this step, fitting the fitting groove 29 of the sensor case 20 into the edge on the open end of the cap 30 enables easy and accurate positioning of the fitting position of the cap 30 relative to the sensor case 20. In this state, the plate spring 40 is fit onto the sensor case 20 from outside the sensor case 20 in the connector terminals 33 plugging direction. In this manner, the engaging hole 47 in the intermediate piece portion 46 is engaged with the engaging protrusion 28 in the sensor case 20 and, also, engaging holes 43 in the leg piece portions 42 are engaged with the engaging claws 36 in the cap 30 (third step). In performing this step, strongly pushing the leg piece portions 42 of the plate spring 40 that has been fit into the sensor case 20 necessarily results in engagement of the engaging holes 43 in the leg piece portions 42 with the engaging claws 36 in the cap 30.

Figure 13:
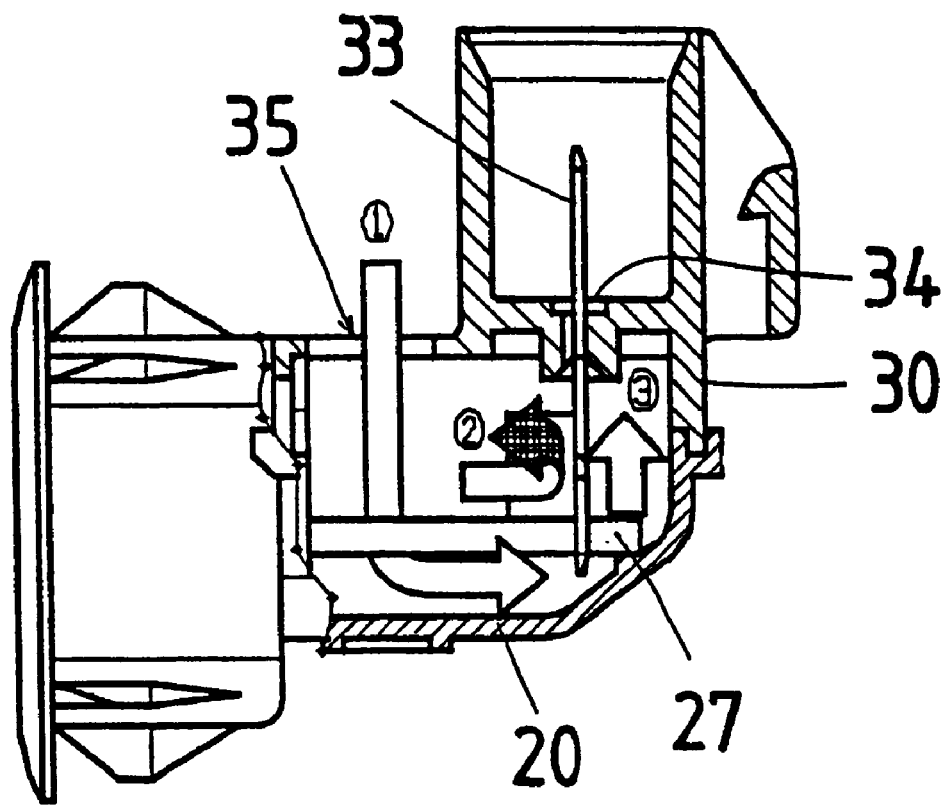
FIG. 13 is a vertical sectional view which schematically shows the molding resin.
Figure 14:
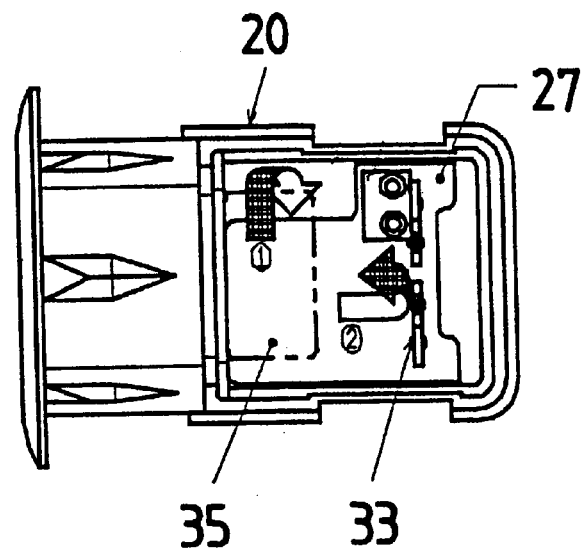
FIG. 14 is a lateral sectional view which schematically shows the molding resin.
Figure 15:
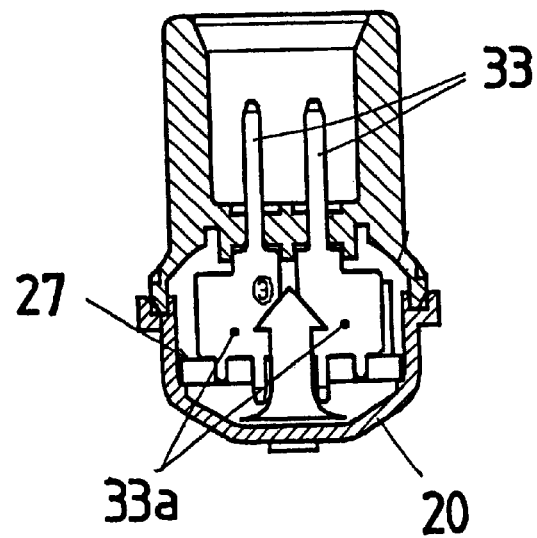
FIG. 15 is a vertical sectional view of the connector for external connection to schematically shown the molding resin.
Figure 16:
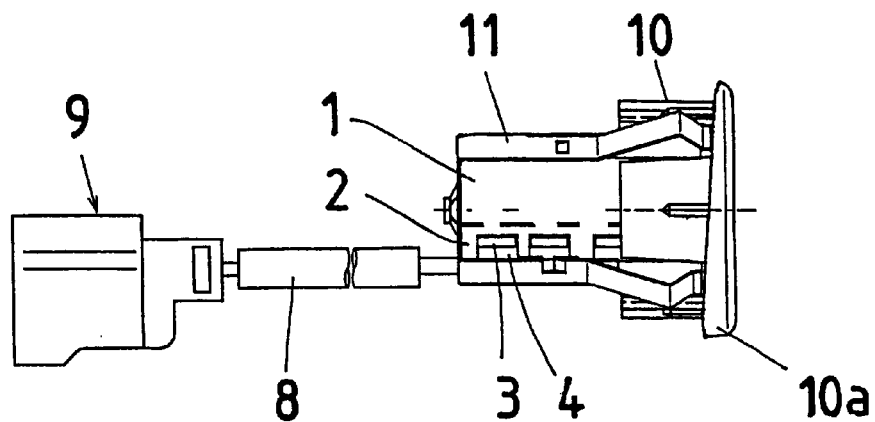
FIG. 16 is a side view showing a conventional ultrasonic obstacle detector.
Figure 17:
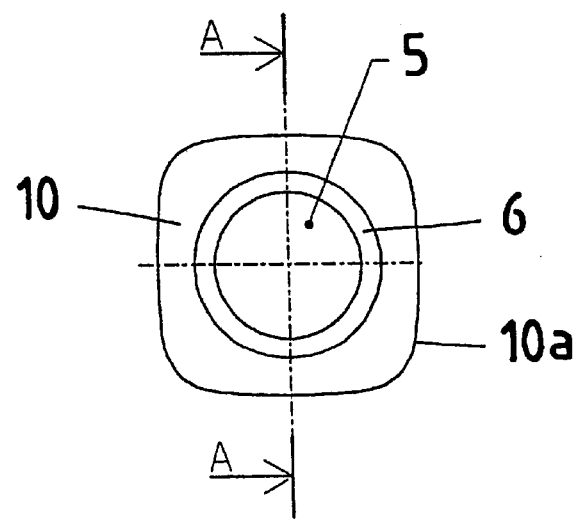
FIG. 17 is a front view of FIG. 16.
Figure 18:
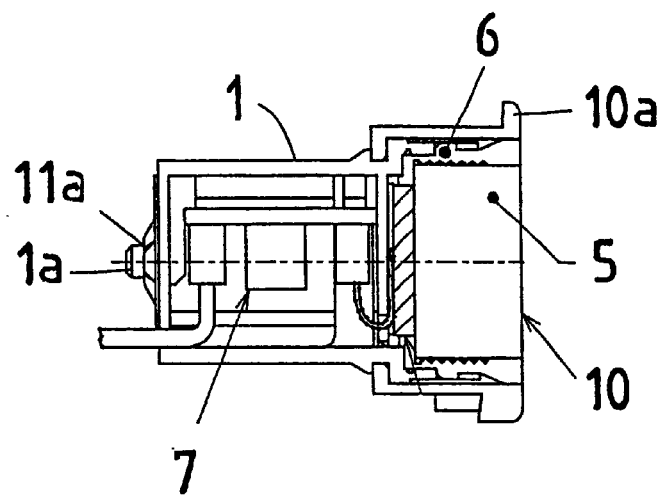
FIG. 18 is a sectional view taken along the line A—A in FIG. 17.
Figure 19:
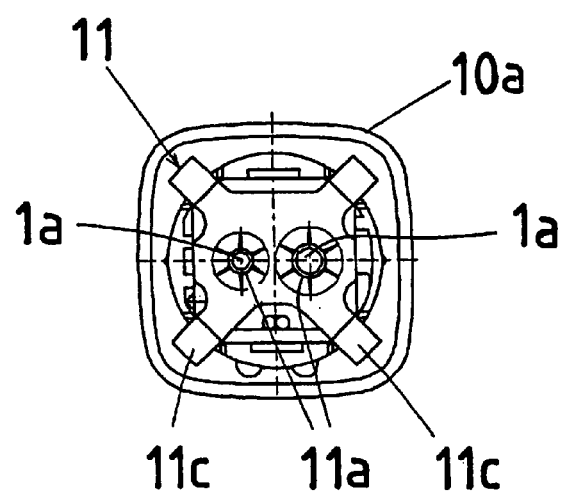
FIG. 19 is a rear end view of FIG. 16.
Figure 20:
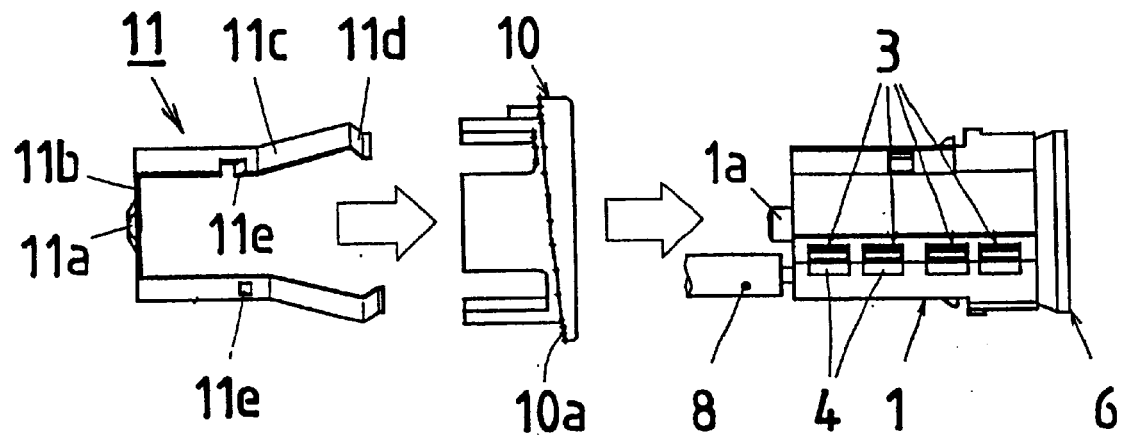
FIG. 20 is an exploded side view of FIG. 16.
Figure 21:
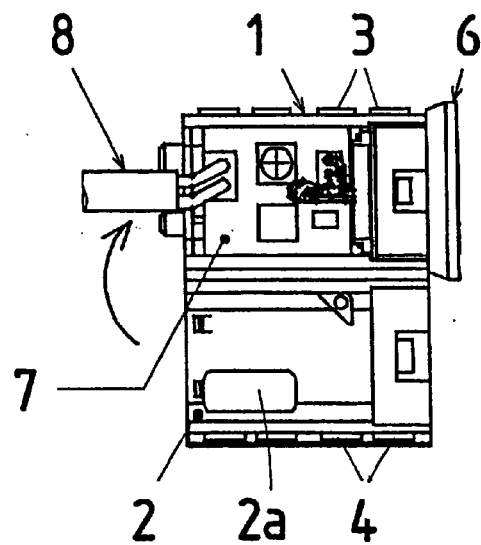
FIG. 21 is a plan view of FIG. 20 with the case cover opened.

Thereafter, a molding resin is filled from the opening 35 in the cap 30 into the space formed between the sensor case 20 and the cap 30. In this case, the broad portions 33a of the connector terminals 33 form walls on the circuit board 27. Therefore, a better air venting can be accomplished, with the result that the molding resin can be smoothly filled into the rear (opposite) side of the circuit board 27. The flow of the molding resin in line with the above description is schematically shown by arrows ①–③ in FIGS. 13 through 15. Further, heat shut-off holes 33b formed in the broad portion 33a of the connector terminals 33 shuts off the transmission of the heat. Therefore, when the terminals 33 are soldered to the circuit board 27, the connector 31 for external connection can be prevented from being melted due to heat. In addition, thanks to those recessed grooves 34 formed around the terminal plug holes 32 which are formed on the side of the open end of the connector 31 for external connection (i.e., on the lower side as seen in FIGS. 8A, 8B), the molding resin can be prevented from adhering to those portions of the connector terminals 33 which come into contact with a mating connector.

The ultrasonic obstacle detector thus assembled is mounted by fitting the sensor case 20 inclusive of the cap 30 into a sensor-mounting hole formed in the bumper or the like of the vehicle from the rear side of the detector. In this case, until the articulated portions 45 of the plate spring 40 pass through the sensor-mounting hole, the elastic engaging member 44 of the plate spring 40 is elastically deformed toward the sensor-mounting hollow portion 21. However, once the articulated portions 45 of the plate spring 40 have passed through the sensor mounting hole of the vehicle, the elastic engaging member 44 is elastically restored to its original position. As a result, the peripheral wall portion of the sensor-mounting hole of the vehicle is pinched between the articulated portions 45 of the elastic engaging member 44 and the outward flange 22. The mounting of the ultrasonic obstacle detector on the bumper or the like of the vehicle is thereby finished.

As described above, according to the invention, it is possible to obtain effects that the invention implements easy integration of the sensor case and the cap together, and that it exhibits the ability for assembling and fixing the detector to a bumper or the like of a vehicle by means of a single plate spring. Therefore, with a cap fit to a sensor case having an integrally formed sensor-mounting hollow portion into which an ultrasonic sensor is fit, a plate spring being fit onto the outside of the sensor case to engage with the cap, so as to integrally fix the sensor case and the cap by holding them together. In addition, the plate spring has an integrally formed elastic engaging member for pinching a peripheral wall portion of a sensor-mounting hole between the flange and the elastic engaging member.

According to the invention, it is possible to obtain effects that the invention provides a simple plate spring in construction, and that only forcibly fitting of the plate portion onto the sensor case while holding the sensor case by both the leg piece portions permits easy and sure engagement of the engaging holes in both leg piece portions with the engaging claws. Therefore, the plate spring comprises: a substantially U-shaped spring body portion having on each lateral side thereof a leg piece portion which is fit onto the outside of the sensor case; an engaging hole formed in respective leg piece portions; the arm-shaped elastic engaging member extending forward from each of the leg piece portions and elastically deformable in the relative direction each other; and an articulated portion formed in an articulated manner on each front end of the arm-shaped portion so as to pinch the peripheral wall portion of the sensor-mounting hole between the flange and the articulated portion. In addition, the cap has on each outside wall thereof an engaging claw for engaging into the engaging hole.

According to the invention, it is possible to obtain effects that the invention gives stable assembly of the plate spring into both the sensor case and the case, and that it also secures the assembly strength. Therefore, the plate spring further comprises an intermediate piece portion which extends forward from the spring body portion between both the leg piece portions, and which has an integrally formed engaging protrusion on an outer wall portion thereof for engaging into the engaging hole in the sensor case.

According to the invention, it is possible to obtain effects that the invention provides easy and accurate positioning of the fitting position of the cap relative to the sensor cap with improved in the workability and further increased in the assembly strength between the sensor and the cap. For the reason that a rugged portion is formed on an open end of the sensor case and a coupling surface of the cap.

According to the invention, it is possible to obtain an effect that the invention gives better water proofness. Therefore, a molding resin is filled into an inside space formed between the sensor case and the cap.

According to the invention, it is possible to obtain an effect that the invention offers easy filling of the molding resin into the cap after having integrally assembled the sensor case and the plate spring. Therefore, the cap has an opening for filling a molding resin therethrough.

According to the invention, it is possible to obtain an effect that the invention obviates a connector for external connection equipped with connector lead wires with reduced in the number of parts and improved in the assembly workability. Therefore, the cap has formed therewith a connector for external connection.

According to the invention, it is possible to obtain an effect that the invention gives a possibility of the mounting on a vehicle having a smaller mounting depth. Therefore, the connector for external connection is integrally formed with the cap so as to extend relative to the cap in a direction substantially perpendicular to the axial direction of an ultrasonic sensor.

According to the invention, it is possible to obtain effects that the invention gives water proofness to the inserting portions of the connector terminal, thanks to the molding resin filled into the space formed between the sensor case and the cap, that it prevents the molding resin from reaching the portion of the connector terminal which comes into contact with a mating connector, and that it obviates additional parts such as a sealing rubber or the like, resulting in reduction in the cost of materials. Therefore, the connector for external connection is arranged such that a connector terminal extends outward beyond the cap.

According to the invention, it is possible to obtain effects that the invention provides secure integration of the connector terminal and the cap, that it offers further stable holding of the circuit board to be plugged into the connector terminal for subsequent soldering, and that it improves the workability of assembly of the sensor. Therefore, the connector terminal is plugged into a terminal plug hole formed in the cap such that the connector terminal and the terminal plug hole form a wedge-engagement with each other.

According to the invention, it is possible to obtain effects that the invention prevents the resin in a molding from adhering to the portion of the connector which comes into contact with the molding connectors. Therefore, the cap has on an inner wall thereof a recessed groove surrounding the terminal plug hole, the resin in a molding will stay within the recess.

According to the invention, it is possible to obtain effects that the invention shuts off heat generated in soldering the connector terminal to the circuit board, and that it prevents the influence of heat from reaching the connector for external connection. Therefore, the connector terminal has a heat shutoff hole near the bottom portion of the connector terminal which is inserted into the circuit board.

According to the invention, it is possible to obtain effects that the invention improves the workability. Therefore, a method is adopted in which the connector terminal, the circuit board, the sensor case, and the plate spring are sequentially assembled in one direction.

While preferred embodiment of the invention has been described in terms of the ultrasonic obstacle detector and the method of assembling the same. Nevertheless, it should be understood that it meets all the objects mentioned above and also has the advantages of wide commercial utility, and that the invention has been set forth for purposes of illustration only and not of limitation. That is, the invention is limited only by the following claims which follows.

Accordingly, persons skilled in the art will easily appreciate that various modifications and changes may be made without departing from the sprit and the scope of the invention.

Consequently, reference should be made to the following claims in determining the full scope of the invention.

What is claimed is:

1. An ultrasonic obstacle detector configured to be mounted on a support structure of a vehicle, said detector for detecting an obstacle by ultrasonic waves, said detector comprising:

a sensor case having in a front portion thereof an integrally formed sensor-mounting hollow portion with an outward flange, an ultrasonic sensor being fit into said sensor mounting hollow;

a circuit board contained inside said sensor case and electrically connected to said ultrasonic sensor;

a cap fit into an opening of said sensor case; and a plate spring, which is a separate piece from the sensor case and which is fit onto an outside of said sensor case for engaging with said cap to integrally hold together both said sensor case and said cap, wherein said plate spring has an integrally formed elastic engaging member for pinching a peripheral wall portion of a sensor-mounting hole between said flange and said elastic engaging member.

2. The ultrasonic obstacle detector according to claim 1, wherein said plate spring comprises:

a substantially U-shaped spring body portion having on each lateral side thereof a leg piece portion which is fit onto the outside of said sensor case;

an engaging hole formed inside of said leg piece portion;

an arm-shaped elastic engaging member extending forward from each of said leg piece portions and elastically deformable in the relative direction each other; and an articulated portion formed in an articulated manner on each front end of said arm-shaped portion so as to pinch the peripheral wall portion of the sensor-mounting hole of the vehicle between said flange and said articulated portion;

wherein said cap has on each outer side wall thereof an engaging claw for engaging into said engaging hole.

3. The ultrasonic obstacle detector according to claim 2, wherein said plate spring further comprises an intermediate piece portion which extends forward from said spring body portion between both said leg piece portions and which has an engaging hole formed therein, and wherein said sensor case has an integrally formed engaging protrusion on an outer wall portion thereof for engaging into said engaging hole in said sensor case.

4. The ultrasonic obstacle detector according to claim 1, wherein a rugged engaging portion is formed on an open end of said sensor case and a coupling surface of said cap.

5. The ultrasonic obstacle detector according to claim 1, wherein a molding resin is filled into an inside space formed between said sensor case and said cap.

6. The ultrasonic obstacle detector according to claim 1, wherein said cap has an opening for filling a molding resin therethrough.

7. The ultrasonic obstacle detector according to claim 1, wherein said cap has a connector formed integrally therewith for external connection.

8. The ultrasonic obstacle detector according to claim 7, wherein said connector for external connection is integrally formed with said cap so as to extend relative to said cap in a direction substantially perpendicular to an axial direction of an ultrasonic sensor.

9. The ultrasonic obstacle detector according to claim 7, wherein said connector for external connection is arranged such that a connector terminal extends outward beyond said cap.

10. The ultrasonic obstacle detector according to claim 9, wherein said connector terminal is plugged into a terminal plug hole formed in said cap such that said connector terminal and the terminal plug hole form a wedge-engagement with each other.

11. The ultrasonic obstacle detector according to claim 10, wherein said cap has on an inner wall thereof a recessed groove surrounding the terminal plug hole.

12. The ultrasonic obstacle detector according to claim 10, wherein said connector terminal has a heat shutoff hole near that bottom portion of said connector terminal which is inserted into said circuit board.

13. A method of assembling an ultrasonic obstacle detector comprising:
- a first step of plugging a connector terminal into a terminal plug hole formed in a cap to be fit into a sensor case;
- a second step of, after having plugged said connector terminal, plugging a circuit board through said connector terminal for soldering, and fitting said sensor case into said cap in a plugging direction of said terminal while containing said circuit board inside said sensor case; and
- a third step of, after the fitting at said second step, fitting a plate spring onto said sensor case in the plugging direction of said terminal into said cap to engage said plate spring with said cap.

14. The ultrasonic obstacle detector of claim 1, wherein the support structure is a bumper of the vehicle.

15. An ultrasonic obstacle detector assembly for detecting an obstacle by ultrasonic waves, comprising:
- a support structure of a vehicle;
- a sensor case having in a front portion thereof an integrally formed sensor-mounting hollow portion with an outward flange, an ultrasonic sensor being fit into said sensor mounting hollow;
- a circuit board contained inside said sensor case and electrically connected to said ultrasonic sensor;
- a cap fit into an opening of said sensor case; and
- a plate spring, which is a separate piece from the sensor case and which is fit onto an outside of said sensor case for engaging with said cap to integrally hold together both said sensor case and said cap,
- wherein said plate spring has an integrally formed elastic engaging member for pinching a peripheral wall portion of a sensor-mounting hole between said flange and said elastic engaging member.

16. The assembly of claim 15, wherein the plate spring comprises:
- a substantially U-shaped spring body portion having on each lateral side thereof a leg piece portion which is fit onto the outside of the sensor case;
- an engaging hole formed inside of the leg piece portion;
- an arm-shaped elastic engaging member extending forward from each of the leg piece portions and elastically deformable in a direction relative to each other; and
- an articulated portion formed in an articulated manner on each front end of the arm-shaped portion that pinches the peripheral wall portion of the sensor-mounting hole of the vehicle between the flange and the articulated portion;
- wherein the cap has on each outer side wall thereof an engaging claw for engaging into the engaging hole.

17. The assembly of claim 15, wherein the cap has a connector formed integrally therewith for external connection.

18. The assembly of claim 17, wherein the connector for external connection is arranged such that a connector terminal extends outward beyond the cap, wherein the connector terminal is plugged into a terminal plug hole formed in the cap such that the connector terminal and the terminal plug hole form a wedge-engagement with each other, and wherein the connector terminal has a heat shutoff hole near a bottom portion of the connector terminal that is inserted into the circuit board.

19. The assembly of claim 17, wherein the connector for external connection is arranged such that a connector terminal extends outward beyond the cap, and wherein the connector terminal has a heat shutoff hole near a bottom portion of the connector terminal that is inserted into the circuit board.

20. An ultrasonic obstacle detector configured to be mounted on a support structure of a vehicle, said detector for detecting an obstacle by ultrasonic waves, said detector comprising:
- a sensor case having in a front portion thereof an integrally formed sensor-mounting hollow portion with an outward flange, an ultrasonic sensor being fit into said sensor mounting hollow;
- a circuit board contained inside said sensor case and electrically connected to said ultrasonic sensor;
- a cap fit into an opening of said sensor case; and
- a plate spring fit onto an outside of said sensor case for engaging with said cap to integrally hold together both said sensor case and said cap,
- wherein said plate spring has an integrally formed elastic engaging member for pinching a peripheral wall portion of a sensor-mounting hole between said flange and said elastic engaging member; and
- wherein said cap has a connector formed integrally therewith for external connection;
- wherein said connector for external connection is arranged such that a connector terminal extends outward beyond said cap; and
- wherein said connector terminal is plugged into a terminal plug hole formed in said cap such that said connector terminal and the terminal plug hole form a wedge-engagement with each other.

21. The ultrasonic obstacle detector according to claim 20, wherein said connector terminal has a heat shutoff hole near that bottom portion of said connector terminal which is inserted into said circuit board.

* * * * *